United States Patent [19]

Bell

[11] 4,094,862

[45] June 13, 1978

[54] PROCESS FOR PREPARING THERMOPLASTIC AROMATIC POLYIMIDES

[75] Inventor: Vernon L. Bell, Seaford, Va.

[73] Assignee: The United States of America as represented by the Administrator of the National Aeronautics and Space Administration, Washington, D.C.

[21] Appl. No.: 562,992

[22] Filed: Mar. 28, 1975

Related U.S. Application Data

[63] Continuation-in-part of Ser. No. 448,321, Mar. 5, 1974, abandoned.

[51] Int. Cl.$^2$ .............................................. C08G 73/10
[52] U.S. Cl. ................................. 260/65; 260/47 CP; 260/49; 260/63 R; 260/63 N; 260/78 TF
[58] Field of Search .................. 260/47 CP, 65, 63 N, 260/78 TF, 63 R

[56] References Cited

U.S. PATENT DOCUMENTS

| 3,179,614 | 4/1965 | Edwards | 260/30.2 |
|---|---|---|---|
| 3,666,709 | 5/1972 | Suzuki et al. | 260/33.4 |

*Primary Examiner*—Lester L. Lee
*Attorney, Agent, or Firm*—Wallace J. Nelson; John R. Manning; Howard J. Osborn

[57] ABSTRACT

A method of preparing insoluble thermoplastic aromatic polyimides having uniquely low softening temperatures by reacting, in a suitable solvent, an aromatic dianhydride and a meta-substituted aromatic diamine.

6 Claims, No Drawings

PROCESS FOR PREPARING THERMOPLASTIC AROMATIC POLYIMIDES

ORIGIN OF THE INVENTION

This invention was made by an employee of the National Aeronautics and Space Administration and may be manufactured and used by or for the Government of the United States of America for governmental purposes without the payment of any royalties thereon or therefor.

This is a continuation-in-part of application Ser. No. 448,321 filed Mar. 5, 1974 now abandoned.

BACKGROUND OF THE INVENTION

This invention relates to the preparation of useful polyimides and more particularly to the preparation of aromatic polyimides with unusually low softening or glass transition temperatures resulting from the use of diamine monomers with specific stereoisomeric features in the preparation of the polyimides.

Polyimides are well known and are used widely in many applictions. However, they suffer from several deficiencies which detract from their usefulness. For example, since aliphatic polyimides have relatively poor thermooxidative stability, the aromatic polyimides are much preferred for applications requiring the best possible resistance to thermooxidative degradation. Yet the aromatic polyimides are extremely difficult to process due to their insolubility and extremely high softening points or melting points. Early attempts to depress the softening temperatures of aromatic polyimides usually involved the substitution of aliphatic segments into the otherwise aromatic polymers to lower the softening points, but this generally resulted in an accompanying decrease in thermooxidative stability of the modified polyimide (U.S. Pat. No. 3,424,718 issued Jan. 28, 1969, to R. J. Angelo for Copolymers of Aromatic Tetracarboxylic Acids with at least Two Organic Diamines).

Others have utilized ester derivatives of the tetracarboxylic acids, rather than dianhydride derivatives, to react with a single aromatic diamine, but while the precursor mixture was thermoplastic at low molecular weights, the high molecular weight polyimides could not be successfully molded even at high temperatures and pressures (U.S. Pat. No. 3,506,583 issued Apr. 4, 1970, to William R. Boram and Luis Acle, Jr., for Monomeric Solid State Solutions of Certain Aromatic Diamines in Derivatives of Benzophenone Tetracarboxylic Acid).

A further development of that approach involved the use of two or more diamines in the reaction with an esterified derivative of 3,3',4,4'-benzophenone tetracarboxylic acid, such that a copolyimide resulted (U.S. Pat. No. 3,726,834 issued Apr. 10, 1973, to Luis Acle, Jr., for Thermoplastic Copolyimides). Although meta-oriented aromatic diamines were used in the formation of the copolyimide precursors, the beneficial effects related to the thermoplasticity of the polymers was ascribed to the random distribution of the mesomers (repeat units) in the polymer chain, said randomness serving to reduce the degree of crystallinity in the copolyimides in contrast to that of the homopolyimides.

Linear aromatic polyimides which are soluble in organic solvents and useful in preparing varnish solutions and the process therefor have been disclosed in U.S. Pat. No. 3,666,709 issued May 30, 1972 to Munehiko Suzuki. Although Suzuki discloses some of the starting materials used in the present invention, the process employed and the end products are quite different from that of the present invention.

I have now discovered that the use of meta-substituted aromatic diamines alone in the preparation of homopolyimides by reacting them with aromatic dianhydrides is remarkably effective in obtaining homopolyimides which are thermoplastic at such unusually low temperature as to make them moldable and otherwise processable under more favorable conditions.

The primary object of this invention is to provide a method for preparing insoluble aromatic polyimides with significantly reduced glass transition temperatures, without a concomitant loss of the high level of thermooxidative stability typical of aromatic polyimides. Such lowered glass transition temperatures lead to a softened state in the polyimides which permits them to be readily processed into such useful articles as sheets, thin films, fibers, foams, and molded and laminated pieces.

It is a further object of this invention to provide a process for cross-linking or curing such polymers by means of a post-forming step such that the glassy transition (or softening) temperatures are increased so that the shaped polymer articles can be used at temperatures greater than those at which they were formed.

The polyimides which are prepared by the present invention are characterized by a recurring unit with the following structural formula:

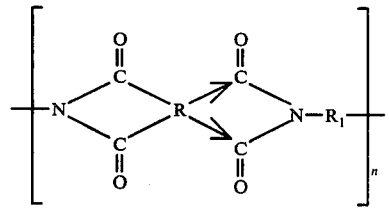

where the arrows denote isomerism, and

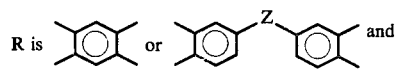

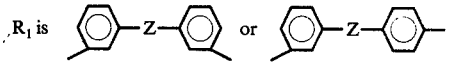

Z represents connecting groups, used to couple the phenylene rings through a single atom of the connecting group, e.g.,

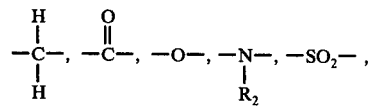

$R_2$ being selected from a group consisting of alkyl and aryl.

Among the diamines which are suitable for use in the present invention are: 3,3'-diaminobenzophenone, 3,4'-diaminobenzophenone, 3,3'-diaminodiphenylmethane, 3,4'-diaminodiphenylmethane, 3,3'-diaminodiphenyl sulfide, 3,4'-diaminodiphenyl sulfide, 3,3'-diaminodiphenyl ether, and 3,4'-diaminodiphenyl ether.

Typical dianhydrides which are suitable for use in this invention are: pyromellitic dianhydride, 3,3',4,4'-benzophenone tetracarboxylic acid dianhydride, bis(3,4-dicarboxyphenyl) ether dianhydride, bis(3,4-dicarboxyphenyl) sulfone dianhydride, bis(3,4-dicarboxyphenyl) methane dianhydride.

These polyimides display outstanding physical and chemical properties which make them suitable for fabrication to shaped articles such as films, fibers and laminated composites of reinforced resins. These articles have high tensile and flexural properties as well as outstanding thermal and thermooxidative stability. The markedly decreased glass transition temperatures of these polymers, which result quite unexpectedly from one or both of the amine groups of the aromatic diamine being substituted on the benzene rings in positions meta to the Z group connecting the two benzene rings, lead to softening of the polyimides when they are heated above the glass transition temperatures and thus contribute to vastly improved processing characteristics for the polyimides. The glass transition temperatures of polyimides prepared from the m,m'- and m,p'-steroisomeric diamines are as much as 50°–75° C. lower than those for polyimides made from the p,p'- diamines customarily used in polyimide preparation. The polyimides are prepared by reacting the m,m'-(3,3+-) and m,p'-(3,4'-) diaryl diamines with pyromellitic dianhydride or 3,3',4,4'-benzophenone tetracarboxylic acid dianhydride in an organic solvent which dissolves at least one of the reactants, for a time and temperature sufficient to give a polyamide-acid with the recurring unit:

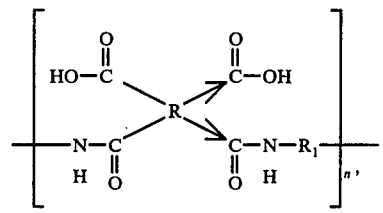

where R and $R_1$ are as previously defined, and $n$ is an integer sufficient to provide an inherent viscosity of at least 0.1 and preferably 0.3–5.0, as measured at 35° C. at a concentration of 0.5 percent by weight of the polyamide-acid in a suitable solvent, usually of the N,N-dialkylcarboxylamide class, e.g., N,N-dimethylformamide, N,N-dimethylacetamide, etc.

The invention will be illustrated more completely by the following exemplary specific examples. Thermooxidative stability is determined by heating a sample of the polymer in air from room temperature to 400° C. at a steady rate of either 1° C/minute or 5° C/minute (dynamic), and at 300° C. in air for up to 500 hours (isothermal). A dynamic weight loss of less than 5 percent at 400° C. is considered good, and a loss of less than 3 percent by weight is excellent. An isothermal weight loss of less than 1 percent of the weight of the polymer per 100 hours at 300° C. is considered excellent. Thermomechanical analysis of 1 mil films is used to determine glass transition temperature ($T_G$) of the polymers. Strips of the films, 1 by 6 millimeters, are mounted in clamps and heated under load at constant rates of 5°, 10° and 15° C, per minute from room temperature up to 450° C., or until the specimen ruptures or elongates to excess. The elongation of the films is recorded with respect to temperature and tangents are drawn to the horizontal and vertical portions of the curve. The intersection of the tangents represents a $T_G$ for that rate. A plot of $T_G$ for the various rates is extrapolated to a zero heating rate, which is designated as the glass transition temperature for that polymer.

EXEMPLARY SPECIFIC EXAMPLES

EXAMPLE 1

To a solution of 0.4956 gram (0.0025 mole) of m,m'-diaminodiphenylmethane (m,m'-MDA) in 11.7 grams of N,N'-dimethylacetamide (DMAc), which had been distilled under reduced pressure from calcium hydride, was added 0.8055 g. (0.0025 mole) of sublimed 3,3',4,4'-benzophenone tetracarboxylic acid dianhydride (BTDA) as a granular solid. Adequate stirring was provided for the viscous solution. After overnight stirring, an inherent viscosity (at 0.5% concentration in DMAc and 35° C) value of 0.41 was measured. A thin film of the polymer was prepared by spreading the polyamic-acid solution onto a glass plate and allowing it to dry in air at room temperature. The film was then dried in an air oven at 100° C. for 1 hour, and then dried and converted to polyimide by heating at 200° C. for 2 hours. A portion of this film was then analyzed by thermomechanical methods to give a glass transition temperature of 211° C. The remainder of the film was then heated for 1 hour at 300° C. to give a glass transition temperature of 284° C. Dynamic thermogravimetric analysis of a 2 milligram sample of the latter film, in air at 5° C/minute heating rate, disclosed only a 1% loss in weight after heating to 400° C.

Examples 2–3

The procedure of Example 1 was used to prepare polyimides of BTDA and m,p'-diaminodiphenylmethane (m,p'-MDA) and p,p'-diaminodiphenylmethane (p,p'-MDA). A summary of the polymers prepared in Examples 1–3 and their relative properties is shown in Table I.

TABLE I

| Ex. | Polyimide | ηinh(0.5%, DMAc, 35°) (Polyamic-acid) | $T_G$ 200° C Cure | $T_G$ 300° C Cure | Wt. Loss in Air at 400° C ΔT/Δt = 5° C/min |
|---|---|---|---|---|---|
| 1 | BTDA-m,m'-MDA | 0.41 | 211° C | 284° C | 1% |
| 2 | BTDA-m,p'-MDA | .99 | 231° C | 300° C | 1% |
| 3 | BTDA-p,p'-MDA | .96 | 270° C | 275° C | 1% |

It is obvious from Examples 1–3 that the polymers of Examples 1 and 2, after converting at 200° C., could be processed (shaped articles could be formed) above their glass transition temperatures (which are lower than the $T_G$ for the polymer of Example 3) and then be post-cured at 300° C to give polymers with $T_G$'s (and thus, use temperatures) equal to or greater than the post-cured $T_G$ for the polymer of Example 3. The low weight loss values for polymers 1 and 2 indicate there has been no sacrifice in thermooxidative stability.

Examples 4–6

Using a procedure similar to that for Example 1, polymers were prepared from BTDA and three diaminobenzophenone (DABP) isomers m,m'-diaminobenzophenone (m,m'-DABP), m,p'-diaminobenzophenone (m,p'-DABP) and p,p'-diaminobenzophenone (p,p'-DABP). Similar conclusions to the beneficial processing advantages due to the use of the m,m'- and m,p'-diamines in comparison to the more commonly used p,p'-diamine will be apparent from Table 2.

TABLE 2

| Ex. | Polyimide | $\eta$inh (Polyamic-acid) | $T_G$ After Cure of 200° C | $T_G$ After Cure of 300° C | Wt.Loss in Air at 400° C $\Delta T/\Delta t = 1°$ C/min |
|---|---|---|---|---|---|
| 4 | BTDA-m,m'-DABP | 0.55 | 216° C | 264° C | <2% |
| 5 | BTDA-m,p'-DABP | .43 | 244° C | 282° C | <2% |
| 6 | BTDA-p,p'-DABP | .54 | 259° C | 293° C | <2% |

Examples 7–9

Polyimides were prepared by a procedure similar to that of Example 1, but using pyromellitic dianhydride (PMDA) to react with m,m'-DABP, m,p'-DABP and p,p'-DABP. The markedly lower glass transition temperatures due to the use of m,m'-DABP and m,p'-DABP in comparison to that for the polymer prepared from p,p'-DABP can be noted from the results in Table 3.

TABLE 3

| Ex. | Polyimide Composition | $\eta$inh (Polyamic-acid) | $T_G$ After 300° C Cure | Wt.Loss in Air at 400° C. $\Delta T/\Delta t = 5°$ C/min |
|---|---|---|---|---|
| 7 | PMDA-m,m'-DABP | 0.83 | 318° C | <3% |
| 8 | PMDA-m,p'-DABP | .84 | 340° C | <2% |
| 9 | PMDA-p,p'-DABP | .98 | 420–425° C | <3% |

The polyimides prepared by Examples 1–9 have also proven to remain insoluble in usual organic solvents including those from which they were prepared, such for example, N,N'-dimethylacetamide (MDAc), N,N-dimethylformamide (DMF), N-methyl 2-pyrrolidinone (NMP), dimethyl sulfoxide (DMSO), N,N-dimethyl methoxyacetamide (DMOA), N-diethyl acetamide (DEAc), tetramethyl sulfone, (TMS), dimethyl tetramethylene sulfone (DMTMS), and hexamethyl-phosphoramide (HMPA).

More aromatic polyimides are initially prepared as polyamic-acids in organic solvents of the N,N-dialkylcarboxylamide class. However, after being thermally converted to the imide state they are usually not only insoluble in these same solvents but also are not thermoplastic at temperatures below 300°–400° C.

By the process of the present invention, the polyimides obtained remain insoluble in any organic solvent but are thermoplastic and thus processable at practical working temperatures in the 200°–300° C. range.

The specific examples given and the method of preparing these polyimides are exemplary only and are given merely to illustrate applicant's invention and are not to be considered as limitations thereof.

Obviously, there are many variations and modifications of the present invention in the light of the above teachings. It is therefore to be understood that within the scope of the appended claims the invention may be practiced otherwise than as specifically described.

What is claimed as new and desired to be secured by Letters Patent of the United States is:

1. A method for preparing insoluble thermoplastic aromatic polyimide film having uniquely low softening temperatures by reacting, in a suitable inert solvent,
   (a) an aromatic dianhydride with the structural formula

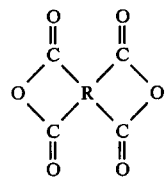

where R is an aromatic tetravalent radical, with
   (b) a diamine of the structural formula

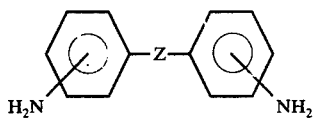

where one or both of the amine groups is located in a meta position on the phenylene ring to the function Z, Z connects the two phenylene rings and is selected from the group consisting of

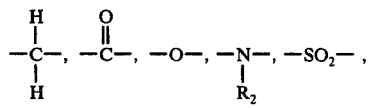

$R_2$ being selected from the alkyl and aryl group, wherein the diamine-dianhydride reaction produces a viscous polymer solution and including the further step of making a film from this viscous solution, drying the film at ambient room temperatures for 4–16 hours, further drying the film in an air circulating oven for 1 hour at 100° C., and heating and maintaining the film to the temperature and range of 200° – 225° C. for at least 2 hours to effect imidization of the polymer film.

2. The method of claim 1 and including the further step of subjecting the polymer to a temperature in the range of 250°–300° C. to further cure the polymer to a glass transition temperature above 250° C.

3. The method of claim 1 wherein the aromatic dianhydride is 3,3',4,4'-benzophenone tetracarboxylic dianhydride and the diamine is selected from a group consisting of 3,3'-diaminobenzophenone, 3,4'-diaminobenzophenone, 3,3'-diaminodiphenyl methane, and 3,4'-diaminodiphenyl methane.

4. The method of claim 1 including the further steps of shaping an article from the polymer and curing this article in the temperature range of 250°–400° C. for at least an hour whereby the shaped article will be cured to thereby retain its shape at temperatures below 250° C.

5. The method of claim 1 wherein the aromatic dianhydride is selected from the group consisting of pyromellitic dianhydride, 3,3',4,4'-benzophenone tetracarboxylic acid dianhydride, bis(3,4-dicarboxyphenyl) ether dianhydride, bis(3,4-dicarboxyphenyl) sulfone dianhydride and bis(3,4-dicarboxylphenyl) methane dianhydride.

6. The method of claim 1 wherein the diamine is selected from the group consisting of: 3,3'-diaminobenzophenone, 3,4'-diaminobenzophenone, 3,4'-diaminodiphenylmethane, 3,4'-diaminodiphenylmethane, 3,3'-diaminodiphenyl ether, and 3,4'-diaminodiphenyl ether.

* * * * *